United States Patent Office 3,436,652
Patented Apr. 1, 1969

3,436,652
METHOD FOR MEASURING DELAY AND DISTORTION OF FREQUENCY COMPONENTS
György Asztalos, Budapest, Hungary, assignor to Meterimpex Magyar Muszeripari Kulkereskedelmi Valialat, Budapest, Hungary
Filed May 10, 1966, Ser. No. 548,917
Int. Cl. G01r 27/02, 25/02
U.S. Cl. 324—57      4 Claims

ABSTRACT OF THE DISCLOSURE

The invention relates to a method for the measurement of group-running time. A triple signal sequence is applied to a circuit under test. The resultant time delay between a first signal sequence of a first frequency and a subsequent second signal sequence of a different frequency is compared with the time delay existing between the second signal sequence and a following third signal sequence of a frequency corresponding to the frequency of the first signal sequence. The relative phase lag is determined from the values of these two time delays.

---

Figure 1:
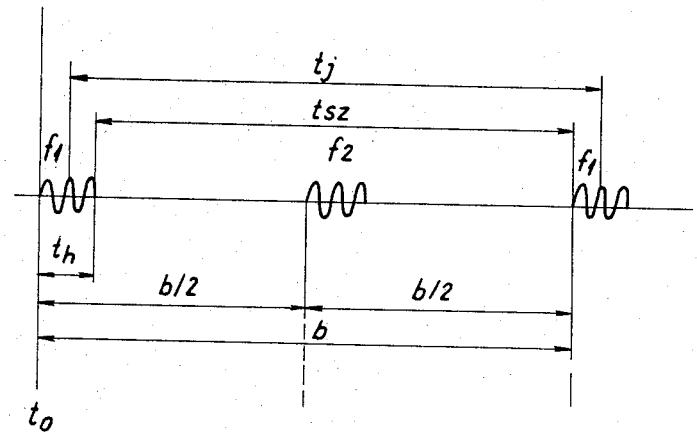

As is known in signal transmission the non-linear phase characteristic introduces certain time lags in the frequency components of the transmitted signal. The magnitude of the distortion so arising is defined by the first derivative of the phase characteristic according to the frequency. This first derivative is called the group running time.

There are several current methods for the measurement of the group running time, however, most of these rely on the Nyquist-Brant procedure. For this reason the Nyquist procedure will now be explained, inasmuch as this procedure at the same time also has all the drawbacks of primary importance also of the other procedures. In the Nyquist procedure the frequency to be measured is modulated in amplitude by an appreciably lower measuring frequency, and then continuously advanced over the circuit to be measured. The phase difference between the demodulated and the original modulating signals is proportional to the phase and group running time of the measured circuit. Unfortunately, the Nyquist-Brant procedure produces satisfactory results only for frequencies above 200 c./s. Until of late a measurement of the group running time was needed only in the higher frequency ranges (above 100 kc./s.), where the procedure stood the test. Recently the necessity has arisen for the measurement of the group running time in the audio frequency band below 200 c./s., further of relatively long group running times (of the order of 50 to 110 msecs.). However, no instruments are so far known which could be used for measurements in the band below 200 c./s. or of group running times in excess of 20 to 30 msecs. A drawback of the Nyquist procedure is its practical uselessness in the low frequency range. The use of an extremely low modulating frequency (of fractions of a cycle) and the still lower wobbulating frequency (of e.g. 0.01 to 0.001 c./s.), the generation, modulation, demodulation, synchronous transmission, filtering, amplification, etc. of these frequencies, as required by the method, presented further difficulties.

Consequently the primary objective of the method according to the invention is to contrive means for the measurement of the group running time in the low audio frequency, in particular the 30 to 300-c./s. band, and of long group running times extending over several wavelengths.

There is no need for enumerating all other known procedures, e.g. that of Siemens or Wandel-Goltermann. These produces are sufficiently known from the video frequency group running time measuring instruments.

In this connection mention may be made that some of the patents are restricted merely to the elimination of certain shortcomings of a few commonly known procedures, whereas the salient features of these procedures have been retained. There are patents which concentrate on design variants of certain partial units (e.g. a solution of phase-measurement in the receiving part, new method of indication on the screen of a cathode-ray tube, etc.).

Figure 2:
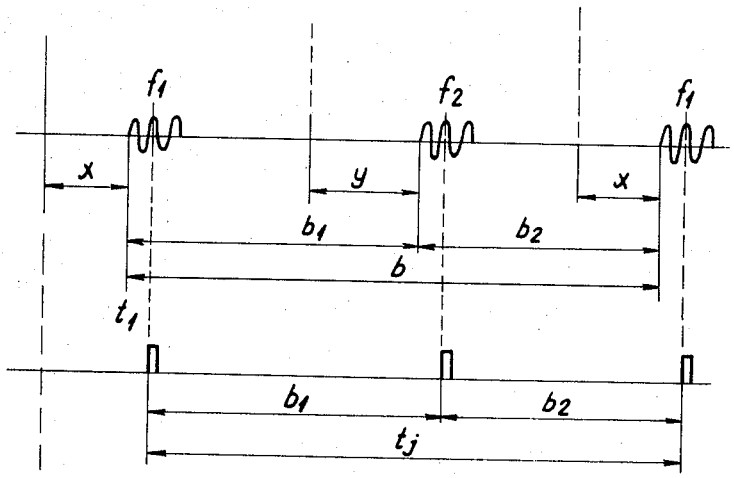
Figure 3:
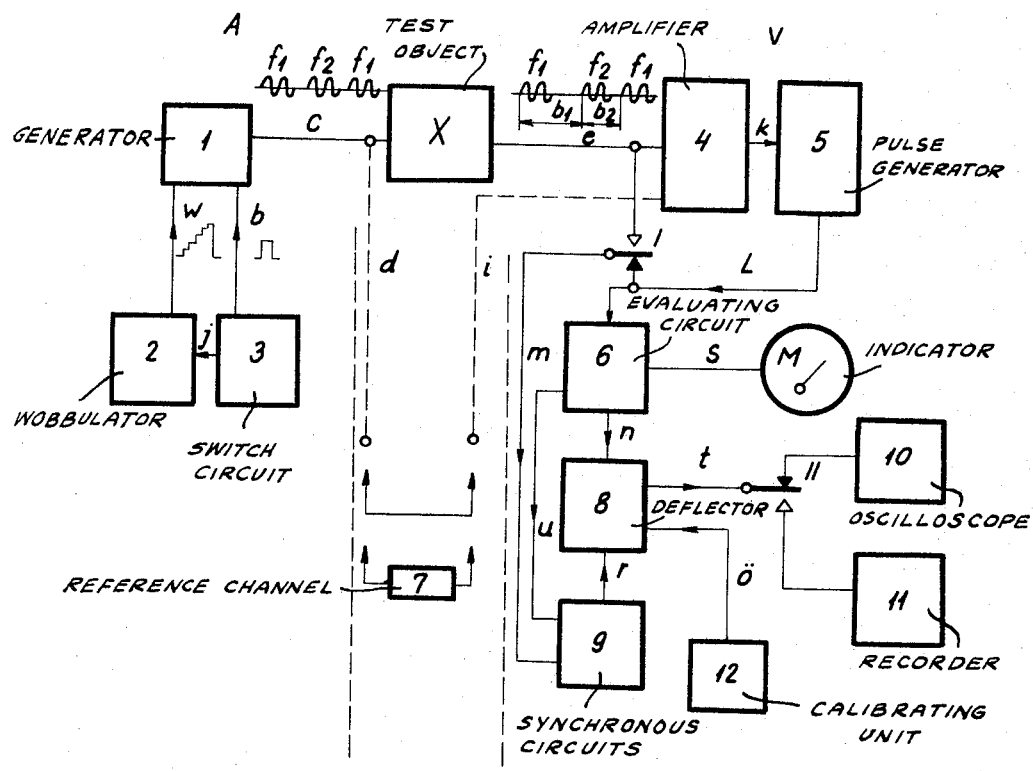

The present invention will be readily understood by reference to the following specification and claims taken in conjunction with the accompanying drawings in which:
FIG. 1 illustrates a plurality of transmitted signal sequences to be applied to a circuit under test in accordance with the present invention;
FIG. 2 illustrates the signal sequences of FIG. 1 as received from a circuit under test; and
FIG. 3 is a block diagram of a measuring circuit for providing the signal sequences of FIGS. 1 and 2.

In the following description among others the following definitions have been used: The measuring frequency or measuring signal is the frequency at which measurement is made, i.e. the frequency whose group running (phase running) time is to be determined. A sequence composed of elementary signals emitted continuously in succession is called a signal sequence or a signal group. A signal sequence is composed of at least two elementary signals, e.g. above and below an imaginary zero line one each of a positive and negative signal, a signal skip, or each a positive and negative sine half-way, etc. (A complete sine wave may therefore be considered composed of two elementary signals.)

The method according to the invention is equally suitable for the measurement of the group running time and its fluctuations, further for recording the characteristics thereof, for the measurement of the phase and phase running times. Essentially the method according to the invention includes the following steps:

On the transmitter side (output terminals) of the measuring instrument at least two signal sequences each composed of mark and space, each including different frequencies, are generated, and from either signal sequence by inserting a space of definite duration at least two signal sequences or let us say a frequency $f_1$ are advanced over the circuit or network to be tested, whereas from the other signal sequence containing a frequency $f_2$, in the space of the two signal sequences of the earlier frequency at least one signal sequence is transmitted to the circuit or network at a definite moment, and then by measuring the time (phase) differences of the signals of the at least three signal sequences assigned to one another on the output of the network to be measured, from the value of the at least two time differences, further from the space of the first signal sequence of a frequency $f_1$ and from the known position of the starting moment of the second signal sequence containing a frequency $f_2$ referred to the first signal sequence containing a frequency $f_1$ the wanted data may be established.

To make clear the method according to the invention in all its details the definition of the group-running time, namely, the limit of the phase angle variation with respect to the frequency variation, will be assumed as known. It follows from the definition of the group running time that the value of the group running time is determined from the phase angle variation measured at several, at least at two frequencies, by some kind of a valuation process. For this reason for the purposes of the method according to the invention at least two signal sequences containing e.g. usually adjacent frequencies $f_1$ and $f_2$ are also needed.

In accordance with the method here described a signal sequency of a frequency $f_1$, composed of a definite number of members of definite length is emitted, then after the expiry of a space of known duration this signal sequence is repeated at least once again in such a way that during the space another signal sequence of a frequency $f_2$ composed of a definite number of members of definite length is advanced over the network to be measured at a known moment. Essentially three signal sequences in time accurately coupled are emitted. In the simplest case, by advancing this signal sequence triplet respectively of frequencies $f_1$, $f_2$, $f_1$ through the circuit or network to be measured, on the output of the network under test the wanted time data may be established from the ratio of the two time differences of the incoming three signal sequences related to one another, and the known differences between the times of emission.

In the method according to the invention for determining the group running time only a triplet of signal sequences is required in the environment of a single frequency.

As regards its structure the method may be outlined in FIGS. 1 and 2 as follows: At a moment $t_0$ a signal sequence of a frequency $f_1$ is emitted for a definite period, then the emission of this signal sequence is followed by a space $t_{sz}$ of any length, and after the lapse of a definite period $b$ reckoned from the moment $t_0$ again a signal sequence of a frequency $f_1$ is emitted. Meanwhile, during space, a signal sequence of a frequency $f_2$ is emitted. In order to simplify the proof of the method it is assumed that the signal sequence of a frequency $f_2$ is emitted e.g. at a moment $b/2$. The signal sequence of a frequency $f_1$ emitted on the transmitter side at a moment $t_0$ will in a time $b/2$ be followed by a signal sequence of a frequency $f_2$, then again on the expiry of a time $b/2$, by another signal sequence of a frequency $f_1$. The signal sequences of frequencies of $f_1$ and $f_2$ transmitted over the network to be measured will arrive at the site of reception with a phase angle lag characteristic of the duration of their respective measuring frequencies. Also on the output of the circuit to be measured the three signal sequences following upon one another will be received, as is shown in FIG. 2. The signal sequences of a frequency $f_1$ will arrive with a time lag (phase angle lag) $x$, those of a frequency $f_2$ with a time lag (phase angle lag) $y$. The first and third signal sequences are of a uniform frequency $f_1$, i.e. both will arrive with a uniform time lag $x$. It stands to reason therefore that the time interval between the received two signal sequences of uniform frequency will not change with respect to one another, and that this time interval will continue to be of a length $b$. The case is an altogether different one with the signal sequence of a frequency $f_2$ meanwhile emitted at another measuring frequency. If it is assumed that the signal sequence has been emitted at a moment $b/2$ reckoned from moment $t_0$, and that $x$ is not equal to $y$, then this signal sequence will be received on the output of the network to be measured shifted from the moment $b/2$, since with respect to frequency $f_1$ the frequency $f_2$ has undergone a different time delay. When now the time interval between the signal sequence of a frequency $f_2$ and the first signal sequence is measured, a value of $b_1$ will be obtained, whereas for the interval between the signal sequence of a frequency $f_2$ and the third signal sequence the interval will be $b_2$, where $b_1 \neq b_2$. The departure of the two values from one another is characteristic of the phase angle variation for the frequency variation, whence the wanted group running period may not be established without the need for a special reference signal. In the previous case the phase angle variation for the frequency variation will be obtained by dividing the difference $b_1 - b_2$ by two. The difference has to be divided by two, because the greater the time value of $b_1$, the smaller the time value of $b_2$, and vice versa. The absolute value of the difference between the two values will be twice the actual time difference. The correctness of the measurement may be proved in an entirely similar way even when the signal sequence of a frequency $f_2$ is transmitted at any moment chosen at random, and not on the expiry of a period $b/2$, and the original position of the signal sequence of a frequency $f_2$ is known.

All that has been set forth above will now be made clear by way of another numeric example. Let it be assumed that the signal sequences of a frequency $f_1$ follow one upon the other at time intervals of 200 units. Let it be assumed that the length of a signal sequence is $t_h = 20$ units, so that there is ample space for the insertion of a signal sequence of a frequency $f_2$. The signal sequence of a frequency $f_2$ follows in the wake of the signal sequence of a frequency $f_1$ at an interval of 100 units. This means that a signal sequence is applied to the circuit to be measured, where $b$ is equal to 200 units, and $b/2$ to 100 units. Let it further be assumed that the still unknown circuit is such that the signal sequence of a frequency $f_1$ will appear at the end of the circuit to be measured with a time lag of $x = 30$ units, and the signal sequence of a frequency $f_2$ with a time lag of $y = 40$ units. However, this circuit is not yet known, nor are the wanted data $y - x = 40 - 30 = 10$ known.

On the output of the circuit to be measured three signal sequences will be received. Also it will be noticed that the signal sequence of a frequency $f_2$ will follow the signal sequence of a frequency $f_1$ at an interval of 110 units, and then the signal sequence of a frequency $f_2$ will follow the new signal sequence of a frequency $f_1$ at an interval of 90 units. I.e. $b_1 = 110$, $b_2 = 90$ units, whence $b_1 - b_2 = 110 - 90 = 20$ units. The fluctuation in question amounts to $20/2 = 10$ units. Further it can be shown that the time value of $b_1 + b_2 = 110 + 90 = 200 = b$ remains unchanged.

A further advantage may be derived from counting and comparing the elementary signals of the sequences, further from starting the particular signal sequences from uniform phase positions. The programmed frequency variation of the signal groups of different frequencies, the variation and specification of their position in the chronological order allows of the full band to be measured. The statements made here can be proved similarly to the earlier statements, and are also self-evident. It is further self-evident that by inserting a further signal sequence of a frequency $f_3$ in the space, inside or outside the signal sequence triplet, and by knowing the time lag $z$ and the earlier position of this subsequently inserted signal sequence, also the absolute values $x$, $y$ of the time deviations, and not only their differences $y - x$ will be measurable. Although the absolute values of the time deviations are not needed for the measurement of the group running time, these values may nevertheless be useful for establishing other measuring data, such as e.g. the phase.

In accordance with the present invention in this manner at least two signal sequences containing different frequencies are generated, and then these signal sequences are transmitted to the input of the network under test in succession, whereas on the output the differences between the time lags (or phase lags) of at least two sorts of signals will be established, as values characteristic of the wanted measuring data. Furthermore from the one measuring signal of a frequency $f_1$ at least two periodic (keyed) sinusoidal sets of signals are applied to the network (circuit) to be measured by inserting a signal space. The time duration $t_{sz}$ of this signal space is smaller than the time (phase) differences, i.e. the signal interval $t_j$ between the signal set starting and zero transition points, or other uniform points of definite time (phase) position suitable for matching, hereinafter points of characteristic phase angle, of the two sets of signals of a frequency $f_1$, and in the space at least a single periodic (keyed) sinusoidal set of signals of a different frequency $f_2$ is transmitted to the network in a way that the point of characteristic phase angle of this set of signals coincides with the mid time (phase) point of the signal space of the two signals of a frequency $f_1$, then on the output of the network the three characteristic time (phase) points are determined by a method known by itself, further the differences between the time duration limited by the first and second time (phase) points and those between the time durations limited by the second and third time (phase) points are established, and a physical (preferably electrical) quantity proportional to one half of the difference is produced as the wanted measuring datum.

As a matter of course, besides the method described a variant of the invention is also realizable where the signal of a frequency $f_2$ is applied to the network at a time (phase) position other than the mid point of the signal space $t_j$, i.e. at a position shifted by a value $\Delta t$, or $\Delta \varphi$ with respect to the previous, where $\Delta t$ is smaller than one half of the time duration $t_{sz}$ of the signal spacing, or one half of the full phase angle $\varphi$, or possibly multiple angle of phase displacement, and where on the output of the network before the further processing of this signal a time shift of a uniform value of $\Delta t$, or a phase shift of $\Delta \varphi$ is completed in the opposite sense. Furthermore in addition to the set of signals of a frequency $f_2$, other sets of signals of frequencies $f_3$ or $f_n$ may be inserted in the space of the set of signals of a frequency $f_1$ at predetermined moments, where the maxima of the sets of signals have a length and a position so that they partially fill up the signal spaces at the exclusive disposal of the particular sets of signals.

As regards further details of the procedure according to the invention mention should be made that the periodically emitted sequence of measuring signals includes the measuring frequency, in the simplest case in the form of a pure sine wave, in a way that the elementary signals of the signal sequence generally consist of pure since waves. Furthermore, for reasons of more convenient evaluation the sequences of measuring signals following one upon the other start from a uniform phase position, and consequently preferably consist of elementary signals starting from a uniform position (phase fixation). In like manner the signal sequences of different frequencies generated at the transmitting end should preferably be fixed in phase with respect to one another, and be composed of elementary signals of uniform position and form. The length of the measuring signal sequences and of the signal space is variable. The number of the elementary signals of the signal sequence may be chosen at option, dependent on the method of solution. In the majority of cases the number of the elementary signals of the measuring signal sequences of frequencies $f_1$ and $f_2$ should preferably be uniform. Another advantage is that the shape of the elementary signals of a signal sequence, their repetition frequency, and amplitude are variable according to a specified programme.

The measuring signal need not in all cases consist of a signal sequence composed of pure sinusoidal elementary signals. In this case the fundamental or upper harmonic of the measuring signal, or its frequency content will contain the frequency to be measured.

It should be noted in this connection that the method according to the invention may be carried out with a measurement by means of a reference signal received directly from outside the network under test, or via a reference channel. Here a periodic (keyed) comparative signal sequence may be obtained directly, or via a reference channel. In this case measurement and evaluation will take place in a manner as detailed above, and the characteristic time of phase points, as the case may be, of the signal sequences will be compared.

Briefly it may be mentioned that by making use of an appropriate known circuit of the signal sequences following one upon the other a signal may be coordinated in a way such that at the position of the preferred elementary signal (e.g. signal start, sine cusp, first, second, etc. or leading or trailing sinusoidal transitions) by means of circuits pulses, start signals, etc. are generated, further switching (counting) circuits are started. When the measuring signal of a frequency $f_1$ passing the circuit is out of phase with respect to the signal of a frequency $f_2$, the signal assigned to the preferred signal of the measuring signal sequence of a frequency $f_1$ will lag behind the similarly preferred signal of fixed position of the signal sequence of a frequency $f_2$.

When the evaluating circuit is realized in a way such that the signal sequences following one upon the other, however, differing in measuring frequency content, show the variation of the reciprocal phase lag or phase advance referred to the frequency difference (variation), then the group running time may be obtained directly on the instrument or printed by a recording device. The measurement of the characteristic of the group running time within the same band may be performed e.g. by a signal sequence, by way of a continuous and periodic frequency variation. However, frequency variation should preferably be performed in a graded manner, by signal sequences following one upon the other, a procedure for which the method is particularly suitable. Thus within the complete frequency band, dependent on the size of frequency grading, measurement may be accelerated, and also measurement with an oscilloscope will be feasible.

The group running time of a frequency may be measured also by alternatingly performing a predetermined frequency variation of a value of $\pm f$ in the environment of the frequency to be measured, by signal sequences following one upon the other, in a way such that within the permissible tolerance the frequency variation is of a small value still measurable, and consequently the limit of the frequency difference will tend to vanish.

The measuring method is suitable also for the measurement of a long running time (of several wavelengths) of the circuit, provided that the space following upon the signal sequence has preferably been chosen sufficiently long, and both long phase runs and group running periods may be measured. The method according to the invention is further suitable for the measurement of the fluctuations of the group running time in that the time difference values obtained in the environment of the different frequencies are compared with one another.

Another particular advantage of the method according to the invention is its adaptability for the improvement of accuracy, whenever this is required. As a matter of fact an elementary signal of the signal sequence other than the first may also be used for measurement after the signals have previously been counted. In this way the effects of possible inaccuracies in signal starting, random noises, or counts may be mitigated. The signal groups, signal sequences emitted may be varied according to several variations, in time, signal content, signal space, frequency, and amplitude. With appropriately chosen variations the method according to the invention may be realized with advantage, as a further invention.

The method according to the invention may be made suitable for the accurate measurement even in the event of an initial distortion of the measuring signal transmitted over the circuit, or the complete failure of the initial sine wave. In accordance with the invention the measuring signals received at the receiver end and the elementary signals of the signal sequence of the measuring signal entering at the transmitter end may be counted, and if the two data are uniform, then the system is in order, if not, then obviously the original signal group has not arrived in its entirety. In general the numeric difference between the received measuring and the measuring signal sequences entering into the system is equal to the length of the elementary signals of the measuring signal sequence, or amounts to a time shift closely defined by this length, which may also be corrected automatically with the introduction of appropriate circuits. The time shift need not necessarily be an integral multiple (1, 2 . . . $n$) of the length, but may instead be a fraction (⅛, ¼, ½) of it.

In accordance with what has been set forth the method according to the invention may be used optionally for the measurement of the group running time, the fluctuations of the group running time, further for recording the characteristics of these, for phase and phase running time measurements, and for recording the phase characteristics.

In the method according to the invention the measuring instrument for the measurement of the group running time and its fluctuations can be realized in a variety of manners. By way of example a block schematic of a set-up as used for the procedure is shown in FIG. 3. Of course the method according to the invention is not restricted to this example, which represents merely one of the many possible solutions.

In each square in FIG. 3 a number of identification has been inscribed. Accordingly the functions of the particular circuits represented in the diagram are as follows: 1, Generator (for the generation of the periodic measuring signal); 2, Wobbulator circuit (frequency control circuit for the measuring signal); 3, Switching circuit (to define the length of mark and space); 4, Coupling circuit (matching, amplifying, filtering circuits); 5, Pulse generating circuit (pulse generator attached to the signal group phase); 6, Evalulating circuit (counting, measuring circuit); 7, Reference channel, if any; 8, Deflecting circuit (signal booster, vertical and horizontal deflection, light modulator); 9, Synchronous circuit; 10, Oscilloscope; 11, Drawing mechanism (e.g. with a mechanized recording instruments, or looped oscillograph on photographic or normal paper); 12, Calibrating circuit (calibration signals, scale identifying signals, etc.) X, circuit to be measured; M, pointer instrument. Small letters, $b$, $c$, $d$ have been used to indicate the connections, multiple connections have been identified with change-over switches distinguished by Roman numerals, I, II . . . It should further be emphasized that any one of the connections may stand for several wire pairs, and the design, number, and position of the change-over switches may vary. For pre-selected permanent connections the change-over switches may even be omitted.

FIG. 3 represents the transmitting section A, the receiving section V, and the circuit X under test between them, and a connection, if any, serving as a basis for comparison. (In general this latter connection may be dispensed with.)

The measuring signal sequences of a specified level and frequency are generated in generator 1 of the transmitting section A (e.g., amplitude stabilized ringing oscillator, periodic AC-generator).

The frequency of the elementary signals of the emitted measuring signal sequence is determined by the wobbulator circuit 2, by means of connection $w$; this circuit produces the required signal triplet. Frequency control may be continuous as well as graded. (In the figure as graded control signal is shown). For graded control the synchronous control signal advances over connection $j$. Length, length control, position in time, etc. of the measuring signal sequence emitted by generator 1 are defined by the signal mark-space defining switching circuit 3 by means of connection $b$. The wobbulator circuit 2 and the switching circuit 3 provide means for manual or automatic variations, or for programmed variations.

The receiving section V receives the measuring signal from the circuit under test X via connection $e$. When necessary, the signal advances via a matching, amplifying and coupling circuit 4 to the pulse generator 5, where a pulse or start signal adjusted to the phase of the signal group or the elementary signal of the signal sequence is generated. The pulse generator 5 within the sinusoidal signal sequence determines the elementary signal and to position where a pulse should arise. When a comparative signal sequence is also used, then this sequence may be received directly, or over the reference channel 7 (connections $d$, $i$). The measuring signal sequence triplet started at moment $t_0$ has been plotted above connection $c$. Also at the receiving end the measuring signal sequence triplet available at moment $t_1$ over connection $e$ has been plotted.

It should be emphasized that with the method according to the present invention in use no reference channel or comparative signal sequences are required for the measurement of the group running time, or its fluctuations, since the group running time or its fluctuations may be determined from the relative time difference or identity of the measuring signals received over the measuring equipment X in succession, however, of different measuring frequency content. This variant of the method according to the invention is of particular importance for transmitting and receiving stations situated at a distance from one another. At the same time for transmitters and receivers in the immediate vicinity also a direct connection is available.

From pulse generator 5 the pulses and start signals advance over connection L to the evaluating circuit 6. Meanwhile the synchronous circuits 9 receive the necessary signals over connection $m$, in a form congruous with the plotting. The evaluating circuit 6 selects the received pulses for measurement, and when necessary counts and identifies these pulses. Dependent on the character of measurement this circuit selects an appropriate basis of reference and carries out measurements. The circuit advances the measuring results obtained over connection $s$ to pointer instrument M, or over connection $n$ to an electrical (oscilloscope) or mechanical recording, or photographic plotting assembly. Also dependent on the character of measurement the synchronous circuits 9 may have to be controlled via connection $u$.

The deflector 8 is over connections $t$ and $o$ closely associated with oscilloscope 10, drawing mechanism 11, or the calibrating unit 12, and vouches for plotting the wanted curves. Deflector unit 8 provides for a deflection conforming to the vertical and horizontal coordinates, further for amplification, light modulated plotting, and calibration (by means of circuits known by themselves). In general the horizontal coordinate stands for a frequency scale, the vertical coordinate for a running time scale. Synchronism of the scales and deflections is taken care of by the synchronous circuit 9 over connection $r$.

The same units provide means for a change of scale or the use of logarithmic instead of linear scales.

What I claim is:

1. A method for measuring at least one characteristic of a circuit which includes applying to the circuit in spaced sequence at least a first and third signal sequence of a first frequency and at least a second signal sequence of a second frequency different from said first frequency, each said sequence including at least two complete signal waves, said first and third signal sequences preceding and succeeding said second signal sequence to provide a first time interval between a first point of measurement in said first signal sequence and a second point of measurement in said second signal sequence and a second time interval between said second point of measurement and a third point of measurement in said signal sequence, receiving said first, second and third signal sequences from said circuit, and utilizing the equal change of said received first and third signal sequences relative to said second recived signal sequence to determine a difference value between said first, second and third signal sequences as applied to the circuit and such sequences as received from the circuit.

2. The method of claim 1 in which the first and second time intervals as applied to the circuit are equal in length, the time difference between the applied and received signal sequences being determined by measuring the first and second time intervals in the received signal sequences, obtaining a difference value between said first and second received time intervals and dividing said difference value in half.

3. The method of claim 1 in which the first and second time intervals are different in length, said second point of measurement being shifted by a first value relative to the midpoint betwen said first and third points of measurement, the determination of said difference value including shifting the second point of measurement in said received signal sequences by a value identical to said first value but in the opposite sense, measuring the first and second time intervals in the received signal sequences, obtaining the difference value between said first and second received time intervals, and dividing said difference value in half.

4. The method of claim 1 in which one or more additional signal sequences having frequencies differing from each other and from said first, second and third signal sequences are interposed between said first, second and third signal sequences, the difference value between said first, third and each individual additional signal sequence as applied to the circuit and such sequences as received from the circuit being determined by utilizing the equal change of said received first and third signal sequences relative to each additional received signal sequence.

References Cited

UNITED STATES PATENTS 2,700,133   1/1955   Pfleger _____ 324—57

RUDOLPH V. ROLINEC, *Primary Examiner.*

E. E. KUBASIEWICZ, *Assistant Examiner.*

U.S. Cl. X.R.

324—83